(12) United States Patent
Dosluoglu et al.

(10) Patent No.: US 7,317,484 B2
(45) Date of Patent: Jan. 8, 2008

(54) CMOS APS READOUT SCHEME THAT COMBINES RESET DRAIN CURRENT AND THE SOURCE FOLLOWER OUTPUT

(75) Inventors: Taner Dosluoglu, New York, NY (US); Peter Alan Levine, West Windsor, NJ (US)

(73) Assignee: Digital Imaging Systems GmbH, Kirchheim, Teck-Nabern (DE)

( * ) Notice: Subject to any disclaimer, the term of this patent is extended or adjusted under 35 U.S.C. 154(b) by 746 days.

(21) Appl. No.: 10/753,638

(22) Filed: Jan. 8, 2004

(65) Prior Publication Data
US 2004/0165093 A1  Aug. 26, 2004

Related U.S. Application Data

(60) Provisional application No. 60/450,087, filed on Feb. 26, 2003.

(51) Int. Cl.
H04N 3/14 (2006.01)
H04N 5/335 (2006.01)
H04N 5/217 (2006.01)

(52) U.S. Cl. ...................... 348/308; 348/241
(58) Field of Classification Search ................ 348/308, 348/241, 242, 243; 257/291, 292; 250/208.1; 345/98, 100
See application file for complete search history.

(56) References Cited

U.S. PATENT DOCUMENTS 4,435,730 A  3/1984 Bendell et al. ............. 358/213

(Continued)

FOREIGN PATENT DOCUMENTS

EP  1253781 A3  10/2002

OTHER PUBLICATIONS

Stanley G. Burns and Paul R. Bond, Principles of Electronic Circuits, 1987, West Publishing Company, 603-604.*

(Continued)

*Primary Examiner*—Ngoc-Yen Vu
*Assistant Examiner*—Christopher K Peterson
(74) *Attorney, Agent, or Firm*—Saile Ackerman LLC; Stephen B. Ackerman; Larry J. Prescott

(57) ABSTRACT

A circuit and method for reducing noise in video imagers which takes advantage of the fact that the same image information is present in the drain current in a reset transistor used to reset a photodiode in a pixel as is present in the readout current. The noise is reduced by passing the multiplexed output voltage from the source follower output transistor in an APS imager system through a high pass filter to reduce the low frequency noise from the source follower. The drain current in the reset transistor used to reset the APS is passed through a low pass filter. The low pass filter output and the high pass filter output are then combined. Since the drain current in the reset transistor contains the same image information as the voltage output of the source follower output transistor the image information can be obtained by combining the output of the low pass filter and the output of the high pass filter. Since the low frequency noise components of the source follower output transistor have been suppressed combined outputs of the low pass filter and high pass filter will provide the image information with greatly suppressed low frequency noise.

27 Claims, 2 Drawing Sheets

U.S. PATENT DOCUMENTS

| | | | |
|---|---|---|---|
| 4,677,490 A | 6/1987 | Levine | 358/213.26 |
| 4,764,814 A | 8/1988 | Endo et al. | 358/213.18 |
| 4,831,451 A | 5/1989 | Hynecek | 358/213.11 |
| 6,067,113 A | 5/2000 | Hurwitz et al. | 348/241 |
| 6,339,363 B1* | 1/2002 | Fowler | 330/308 |
| 6,469,740 B1* | 10/2002 | Kuroda et al. | 348/308 |
| 6,777,660 B1* | 8/2004 | Lee | 250/208.1 |
| 6,781,627 B1* | 8/2004 | Takayanagi | 348/308 |
| 6,803,958 B1* | 10/2004 | Wang | 348/308 |
| 2001/0033337 A1 | 10/2001 | Sakuragi | 348/302 |
| 2004/0080646 A1* | 4/2004 | Zhao et al. | 348/302 |

OTHER PUBLICATIONS

DeGeronimo et al.,"Front-end Electronics for Imaging Detectors," Nuclear Instruments & Methods in Physics Research, Section-A: Accelarators, Spectrometers, Detectors and Associated Equipment, North-Holland Publishing Co., Amsterdam, NL, vol. 471, No. 1-2, Sep. 21, 2001, pp. 192-199.

Kempainen: "CMOS Image Sensors: Eclipsin CCDS in Visual Information?," EDN Electrical Design News, Cahners Publishing Co., Newton, Mass. U.S., Oct. 9, 1997, pp. 101-102, 105-106.

* cited by examiner

US 7,317,484 B2

CMOS APS READOUT SCHEME THAT COMBINES RESET DRAIN CURRENT AND THE SOURCE FOLLOWER OUTPUT

This Patent Application claims priority to the following U.S. Provisional Patent Application, herein incorporated by reference:

60/450,087, filed Feb. 26, 2003

BACKGROUND OF THE INVENTION (1) Field of the Invention

The invention relates to a readout scheme for a CMOS Active Pixel Sensor, APS, that reduces 1/f noise and low frequency fixed pattern noise.

(2) Description of the Related Art

U.S. Pat. No. 4,831,451 to Hynecek describes a horizontal scannar having a plurality of stages. The scanner can be used for electronic zooming and panning operations.

U.S. Pat. No. 4,764,814 to Endo et al. describes a solid state imaging device.

U.S. Pat. No. 4,677,490 to Levine describes a CCD imager having a CCD output register having separate means for obtaining low frequency video response and high frequency video response. The low frequency response is obtained by sensing drain current in the output CCD line register. The high frequency response can be obtained from the electrometer output signal after correlated double sampling or after synchronous demodulation at a harmonic of the output CCD line register clocking rate.

U.S. Pat. No. 4,435,730 to Bendell et al. describes the use of output signals from two portions of a CCD imager. The first output signal is derived from a drain diffusion in the form of a signal current. The second output signal is derived from a floating diffusion or floating gate through an on-chip MOSFET amplifier. The first and second output signals are filtered through complimentary low pass filters and high pass filters respectively and then combined to provide a reduced noise output.

SUMMARY OF THE INVENTION

Low frequency noise and low in a CMOS active pixel sensor, APS, used in an imager is a problem that must be dealt with. The noise is a particularly serious problem since the noise often appears in the visual image derived from the imager. When an entire row of an imager is sampled on chip noise is a problem and is visible in the images as horizontal lines that are difficult to eliminate even with post processing.

U.S. Pat. No. 4,677,490 to Levine, incorporated herein by reference, and U.S. Pat. No. 4,435,730 to Bendell et al., incorporated herein by reference, describe a method of noise suppression in a CCD imager. The method passes the drain current of a CCD reset transistor through a low pass filter, LPF, and the voltage signal from the source follower output transistor through a high pass filter, HPF. The output of the LPF and HPF are combined to suppress the low frequency noise components of the low pass source follower. It is of great interest to have a method of low frequency noise suppression that can be used in CMOS active pixel sensor imager systems.

It is a principle objective of this invention to provide a circuit which will greatly reduce the low frequency noise in complimentary metal oxide semiconductor active pixel sensor imager systems.

It is another principle objective of this invention to provide a method of reading a complimentary metal oxide semiconductor active pixel sensor imager system which will greatly reduce the low frequency noise in the imager output.

These objectives are achieved by taking advantage of the fact that the same image information is present in the drain current of the reset transistor used to reset a photodiode in the pixel as is present in the readout current. The noise is reduced by passing the multiplexed output voltage from the source follower output transistor in an APS imager system through a high pass filter to reduce the low frequency noise from the source follower. The drain current in the reset transistor used to reset the APS is passed through a low pass filter. The low pass filter output and the high pass filter output are then combined. Since the drain current in the reset transistor contains the same image information as the voltage output of the source follower output transistor the image information can be obtained by combining the output of the low pass filter and the output of the high pass filter. Since the low frequency noise components of the source follower output transistor have been suppressed combined outputs of the low pass filter and high pass filter will provide the image information with greatly suppressed low frequency noise.

DESCRIPTION OF THE PREFERRED EMBODIMENTS

Figure 1:
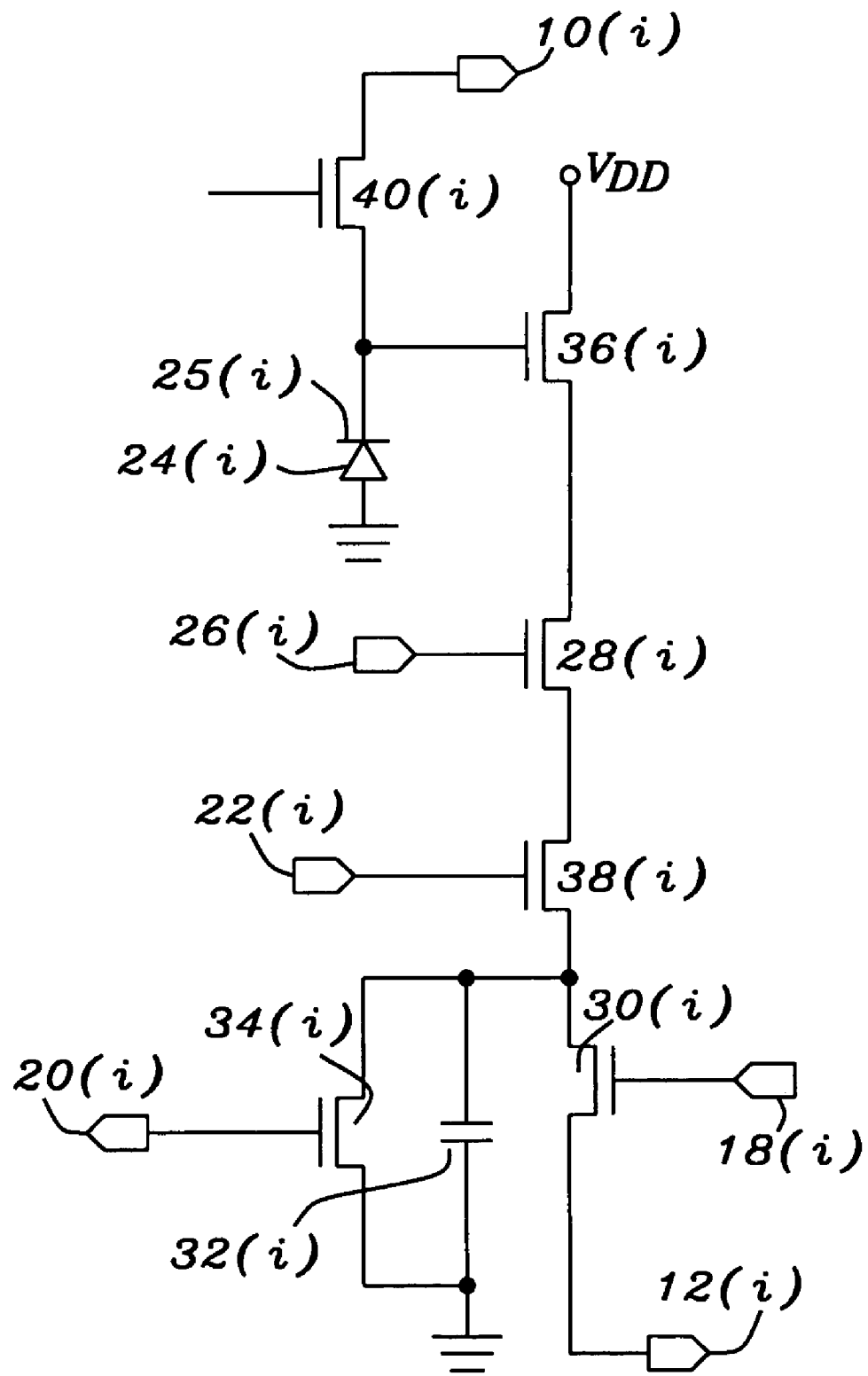
FIG. 1 shows a schematic diagram of one of the signal sample and hold circuits of this invention.
Figure 2:
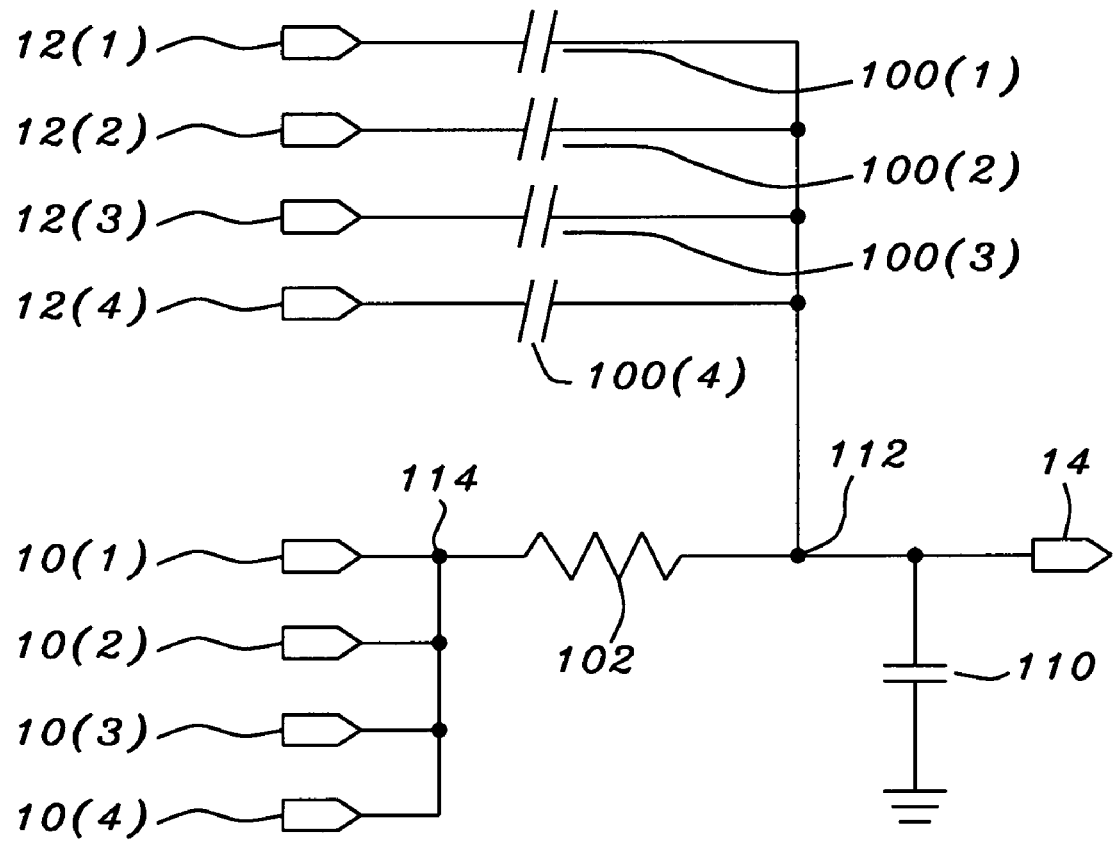
FIG. 2 shows a schematic diagram of an RC network for mixing the low frequency component of the reset current and the high frequency component of the multiplexed output of the source followers.

The circuits used in this invention are shown in FIGS. 1-2. FIG. 1 shows a schematic diagram of one of the sensor circuits of an imager. There can be a number of sensor circuits identical to the circuit shown in FIG. 1, each circuit indicated by the index (i). Typically there will be four such sensor circuits, although a larger or smaller number can be used, with i taking on values of 1, 2, 3, and 4. A photodiode 24(i) is used in each of the sensor circuits to integrate the charge generated by an input signal, such as a light signal, to produce an output signal. Typically, in the sensor circuits described by FIG. 1, each sensor circuit will have a different output signal, such as for different colors. The output of an output transistor 36(i), configured in source follower mode, is used to detect the output signal from the photodiode 24(i) and is fed to a sample and hold capacitor 32(i) by means of a row select transistor 28(i) and a sample transistor 38(i). The gate of the row select transistor 28(i) is connected to a row select terminal 26(i) and the gate of the sample transistor 38(i) is connected to a sample terminal 22(i). Signals at the row select terminal 26(i) and the sample terminal 22(i) are used to turn the row select transistor 28(i) and the sample transistor 38(i) on or off. One terminal of the sample-hold capacitor 32(i) of each sensor circuit is connected to the drain of a column select transistor 30(i). The source of each of the column select transistors 30(i) is connected to a first terminal 12(i). The gate of each of the column select transistors 30(i) is connected to a column select terminal 18(i) which turns the column select transistor 18(i) on or off.

After a charge integration period of the imager the potential at the cathode 25(i) of the photodiode 24(i) will be related to the amount of input signal, such as a light signal,seen by the photodiode 24(i) in each of the sensor circuits.

At the end of the charge integration period signals at the row select terminal 26(i), the sample terminal 22(i), and the column select terminal 18(i) turn the row select transistor 28(i) on, the sample transistor 38(i) on, and the column select transistor 30(i) off. A signal related to the potential at the cathode 25(i) of the photodiode 24(i) is then stored on the sample-hold capacitor 32(i). Prior to storing the signal on the sample-hold capacitor 31(i) the sample-hold capacitor 32(i) has been reset using the sample hold transistor 34(i) having a gate connected to a sample-hold reset terminal 20(i). The sample hold transistor 34(i) can be used to discharge the sample-hold capacitor 34(i) thereby resetting it.

After the signals have been stored on the sample hold capacitors 32(i) in each of the sensor circuits each of the photodiodes 24(i) in each of the sensor circuits are reset by turning on the reset transistors 40(i) in each of the sensor circuits and using a second terminal 10(i) to inject a current into the drains of each of the reset transistors (i). An important factor in this invention is the fact that the amount of drain current required to reset the photodiodes 24(i) is related to the potential at the cathodes 25(i) of the photodiodes 24(i) and thus has the same image information stored on the sample-hold capacitors 32(i).

FIG. 2 shows a schematic drawing of the RC network used to mix the low frequency components of the drain currents used to reset the pixels and the high frequency components of the pixel signals stored on the sample-hold capacitors. As can be seen from FIG. 2 one RC network is used for all of the sensor circuits shown in FIG. 1. FIG. 2 shows the schematic for the example of four sensor circuits. Each of the first terminals; 12(1), 12(2), 12(3), and 12(4); are connected to one end of an input capacitor; 100(i), 100(2), 100(3), and 100(4); for each of the sensor circuits. The other end of each of the input capacitors; 100(i), 100(2), 100(3), and 100(4); are connected to a first node 112. Each of the second terminals; 10(1), 10(2), 10(3), and 10(4); are connected to a second node 114. FIG. 2 is an extension of FIG. 1 and each of the first terminals 12(i) and each of the second terminals 10(i) are the same in both FIGS. 1 and 2. A resistor 102 is connected between the first node 112 and the second node 114. An output capacitor 110 is connected between the first node 112 and ground potential. The first node is connected to an output terminal 14 which is typically connected to the horizontal bus.

Referring to both FIGS. 1 and 2, after the signals have been stored on the sample-hold capacitors 32(i) the row select transistors 28(i) are turned off, the sample transistors 38(i) are turned off, and the reset transistors 40(i) are turned on to reset each of the photodiodes 24(i), see FIG. 1. At the same time, the column select transistors 30(i) are turned on sequentially. It the four circuit example 30(1) is turned on with 30(2), 30(3), and 30(4) off; then 30(2) is turned on with 30(1), 30(3), and 30(4) off; then 30(3) is turned on with 30(1), 30(2), and 30(4) off; and finally 30(4) is turned on with 30(1), 30(2), and 30(3) off. This feeds the combined reset current through a low pass filter, formed by the resistor 102 and the output capacitor 110, and the signal from the source of the column select transistors 30(i) sequentially through a high pass filter, formed by the input capacitors 100(i), the output capacitor 110, and the resistor 102.

Since the output of the column select transistors 30(i) passes through a high pass filter the low frequency noise is suppressed. Since, as previously indicated, the combined reset current, which passes through a low pass filter, contains the same image information as the outputs of the column select transistors 30(i) but without the low frequency noise associated with the source follower outputs of the column select transistors 30(i). The outputs of the high pass filter and the low pass filter are combined in the RC network shown in FIG. 2 to restore the image information with the low frequency noise due the source follower outputs suppressed. The input capacitors 100(i), the output capacitor 110, and the resistor 102 are chosen to provide the proper mixing of the outputs of the high pass filter and low pass filter. Since the input capacitors 100(i) and the output capacitor 110 act as a series capacitor combination the kTC noise is also suppressed.

The use of the drain currents of the reset transistors 40(i) to contribute to the output signal will also increase the overall efficiency of the system and result in lower power requirements.

While the invention has been particularly shown and described with reference to the preferred embodiments thereof, it will be understood by those skilled in the art that various changes in form and details may be made without departing from the spirit and scope of the invention.

What is claimed is:

1. A pixel circuit, comprising:
   a photodiode having a cathode;
   a reset transistor, wherein said reset transistor is a field effect transistor having a source connected to said cathode of said photodiode, and a drain;
   an output transistor, wherein said output transistor is a field effect transistor having a gate connected to said cathode of said photodiode and a source;
   a sample and hold circuit;
   means for electrically connecting said source of said output transistor to said sample and hold circuit or electrically isolating said source of said output transistor from said sample and hold circuit;
   a column select transistor, wherein said column select transistor is a field effect transistor having a drain connected to said sample and hold circuit, a gate connected to a column select input, and a source;
   a first capacitor connected between and an output node and said source of said column select transistor;
   a resistor connected between said output node and said drain of said reset transistor;
   a second capacitor connected between said output node and ground potential.

2. The pixel circuit of claim 1 wherein the potential of said cathode of said photodiode is related to the amount of light impinging on said photodiode during a charge integration period.

3. The pixel circuit of claim 1 wherein said sample and hold circuit comprises a third capacitor and a means for resetting the amount of charge stored on said third capacitor.

4. The pixel circuit of claim 3 wherein said means for resetting the amount of charge on said third capacitor comprises a sample-hold transistor wherein said sample-hold transistor is a field effect transistor having a source and a drain connected in parallel with said third capacitor.

5. The pixel circuit of claim 1 wherein said means for electrically connecting said source of said output transistor to said sample and hold circuit or electrically isolating said source of said output transistor from said sample and hold circuit comprises a row select transistor and a sample transistor connected in series between said source of said output transistor and said sample and hold circuit, wherein said row select transistor and said sample transistor are field effect transistors.

6. The pixel circuit of claim 1 wherein a reset potential is supplied to said first output node to reset said photodiode during a reset period.

7. The pixel circuit of claim 1 wherein said output node is connected to a horizontal output buss.

8. The pixel circuit of claim 1 wherein said reset transistor is turned on, said means for electrically connecting said source of said output transistor to said sample and hold circuit or electrically isolating said source of said output transistor from said sample and hold circuit electrically isolates said source of said output transistor from said sample and hold circuit, and the potential of said cathode of said photodiode is reset during a reset period.

9. The pixel circuit of claim 1 wherein said reset transistor is turned off, said means for electrically connecting said source of said output transistor to said sample and hold circuit or electrically isolating said source of said output transistor from said sample and hold circuit electrically isolates said source of said output transistor from said sample and hold circuit, and charge is accumulated at said photodiode during a charge integration period.

10. The pixel circuit of claim 1 wherein said reset transistor is turned off, said means for electrically connecting said source of said output transistor to said sample and hold circuit or electrically isolating said source of said output transistor from said sample and hold circuit electrically connects said source of said output transistor to said sample and hold circuit, and the potential at said cathode of said photodiode is stored by said sample and hold circuit during a readout period.

11. The pixel circuit of claim 1 wherein a column select signal at said column select input of said output transistor either turns said output transistor on, thereby electrically connecting said sample and hold circuit to said second node, or turns said output transistor off, thereby electrically isolating said sample and hold circuit from said second node.

12. A pixel circuit; comprising:
a number of sensor circuits wherein each of said sensor circuits comprises a photodiode having a cathode, a reset transistor having a source connected to said cathode of said photodiode and a drain, an output transistor having a gate connected to said cathode of said photodiode and a source, a sample and hold circuit, a row select transistor and a sample transistor connected in series between said source of said output transistor and said sample and hold circuit, a column select transistor having a drain connected to said sample and hold circuit and a source;
a first node connected to an output node;
a second node connected to each of said drains of each of said reset transistors of each of said sensor circuits;
a resistor connected between said first node and said second node
a filter capacitor connected between said first node and each of said sources of each of said column select transistors of each of said sensor circuits; and
an output capacitor connected between said first node and ground potential.

13. The pixel circuit of claim 12 wherein said reset transistors, said sample transistors, said row select transistors, said output transistors, and said column select transistors are field effect transistors.

14. The pixel circuit of claim 12 wherein said number of sensor circuits is four sensor circuits.

15. The pixel circuit of claim 12 wherein the potential of said cathode of each of said photodiodes at the end of a charge integration period is related to the amount of light impinging on that said photodiode during said charge integration period.

16. The pixel circuit of claim 12 wherein each of said sample and hold circuits comprise a sample-hold capacitor and a means for resetting the amount of charge stored on said sample-hold capacitor.

17. The pixel circuit of claim 16 wherein said means for resetting the amount of charge on said sample-hold capacitor comprises a sample-hold transistor wherein said sample-hold transistor is a field effect transistor having a source and a drain connected in parallel with said sample-hold capacitor.

18. The pixel circuit of claim 12 wherein a reset potential is supplied to said second node and each of said reset transistors are turned on to reset each of said photodiodes during a reset period.

19. The pixel circuit of claim 12 wherein at the completion of a charge integration period each of said row select transistors are turned on, each of said sample transistors are turned on, and a potential related to the charge accumulated at each photodiode of each said sensor circuit during said charge integration period is stored by said sample and hold circuit of each said sensor circuits.

20. The pixel of claim 12 wherein during a reset period a reset potential is supplied to said second node and each of said reset transistors are turned on thereby causing a reset current to flow from said second node into each of said reset transistors, and each of said column select transistors are turned on sequentially thereby causing a signal current related to a potential stored by said sample and hold circuit of each of said sensor circuits to flow from said source of each of said column select transistors to said first node.

21. A method of reading an active pixel sensor; comprising:
providing a number of sensor circuits wherein each of said sensor circuits comprises a photodiode having a cathode, a reset transistor having a source connected to said cathode of said photodiode and a drain, an output transistor having a gate connected to said cathode of said photodiode and a source, a sample and hold circuit, a row select transistor and a sample transistor connected in series between said source of said output transistor and said sample and hold circuit, a column select transistor having a drain connected to said sample and hold circuit and a source;
providing a first node connected to an output node;
providing a second node connected to each of said drains of each of said reset transistors of each of said sensor circuits;
providing a filter capacitor connected between said first node and each of said sources of each of said column select transistors of each of said sensor circuits;
providing an output capacitor connected between said first node and ground potential;
providing a resistor connected between said second node and said first node;
turning off said reset transistor said sample transistor, and accumulating charge on each of said photodiodes in each of said sensor circuits during a charge integration period;
turning off said reset transistors, turning on said sample transistors, turning on said row select transistors and storing a signal at each of said sample and hold circuits in each of said sensor circuits after said charge integration period has been completed, wherein said signal stored at said sample and hold circuit in each of said sensor circuits is related to the potential of said cathode of said photodiode in that said sensor circuit after said charge integration period has been completed; and turning on said reset transistors, turning off said sample transistors, and sequentially turning on each of said column select transistors after storing said signal at each of said sample and hold circuits in each of said sensor circuits; thereby causing a reset current to flow from said second node to each of said drains of each of said reset transistors, signal currents to flow from each of said sample and hold circuits into said first node, and providing an output signal to said horizontal bus comprising low frequency components of said reset current mixed with high frequency components of said signal currents.

22. The method of claim 21 wherein said reset transistors, said sample transistors, said row select transistors, said output transistors, and said column select transistors are field effect transistors.

23. The method of claim 21 wherein said number of sensor circuits is four sensor circuits.

24. The method of claim 21 wherein the potential of said cathode of each of said photodiodes at the end of said charge integration period is related to the amount of light impinging on that said photodiode during said charge integration period.

25. The method of claim 21 wherein each of said sample and hold circuits comprise a sample-hold capacitor and a means for resetting the amount of charge stored on said sample-hold capacitor.

26. The method of claim 25 wherein said means for resetting the amount of charge on said sample-hold capacitor comprises a sample-hold transistor wherein said sample-hold transistor is a field effect transistor having a source and a drain connected in parallel with said sample-hold capacitor.

27. The method of claim 21 wherein after storing said signal at each of said sample and hold circuits in each of said sensor circuits a reset potential is supplied to said second node and each of said reset transistors are turned on thereby causing said reset current to flow from said second node into each of said drains of said reset transistors.

* * * * *